Sept. 22, 1936.  A. W. TONDREAU  2,055,113
LIGHT TRAP FOR FILM MAGAZINES
Filed May 23, 1932   2 Sheets-Sheet 1
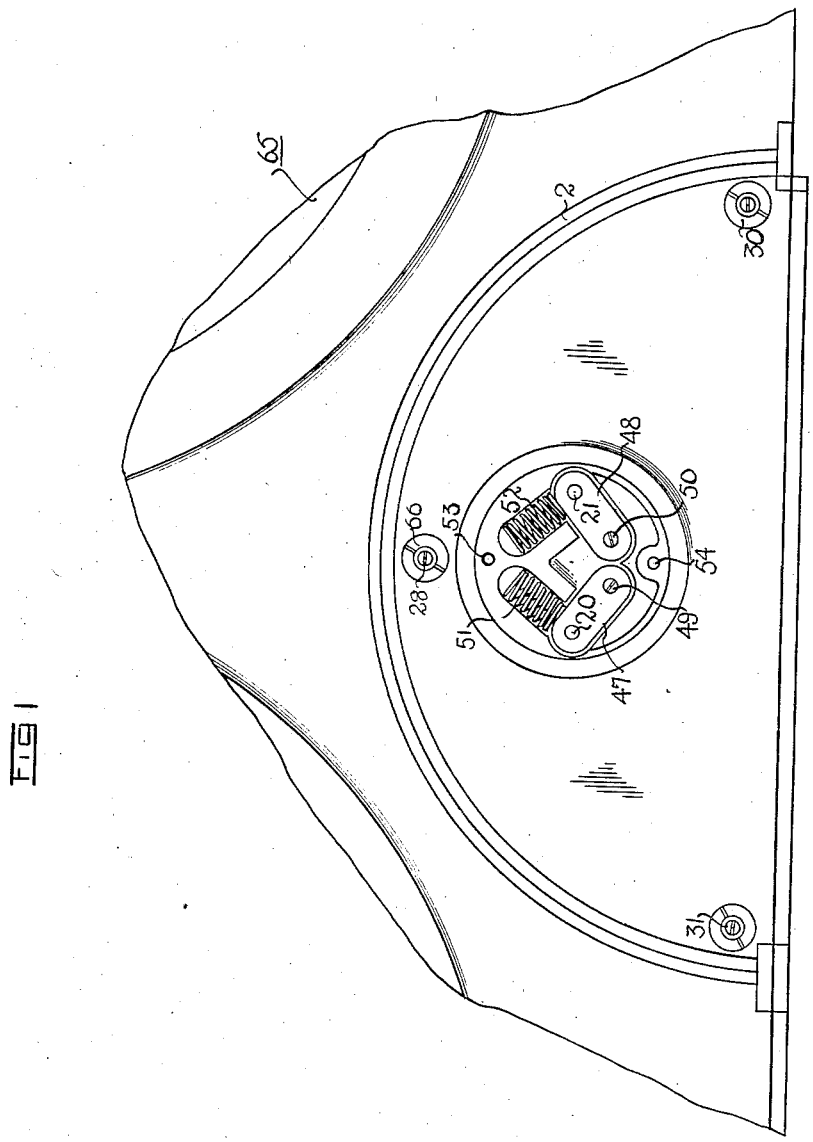
INVENTOR:
ALBERT W. TONDREAU.
BY
W. E. Beatty
ATTORNEY.

Sept. 22, 1936. A. W. TONDREAU 2,055,113
LIGHT TRAP FOR FILM MAGAZINES
Filed May 23, 1932 2 Sheets-Sheet 2
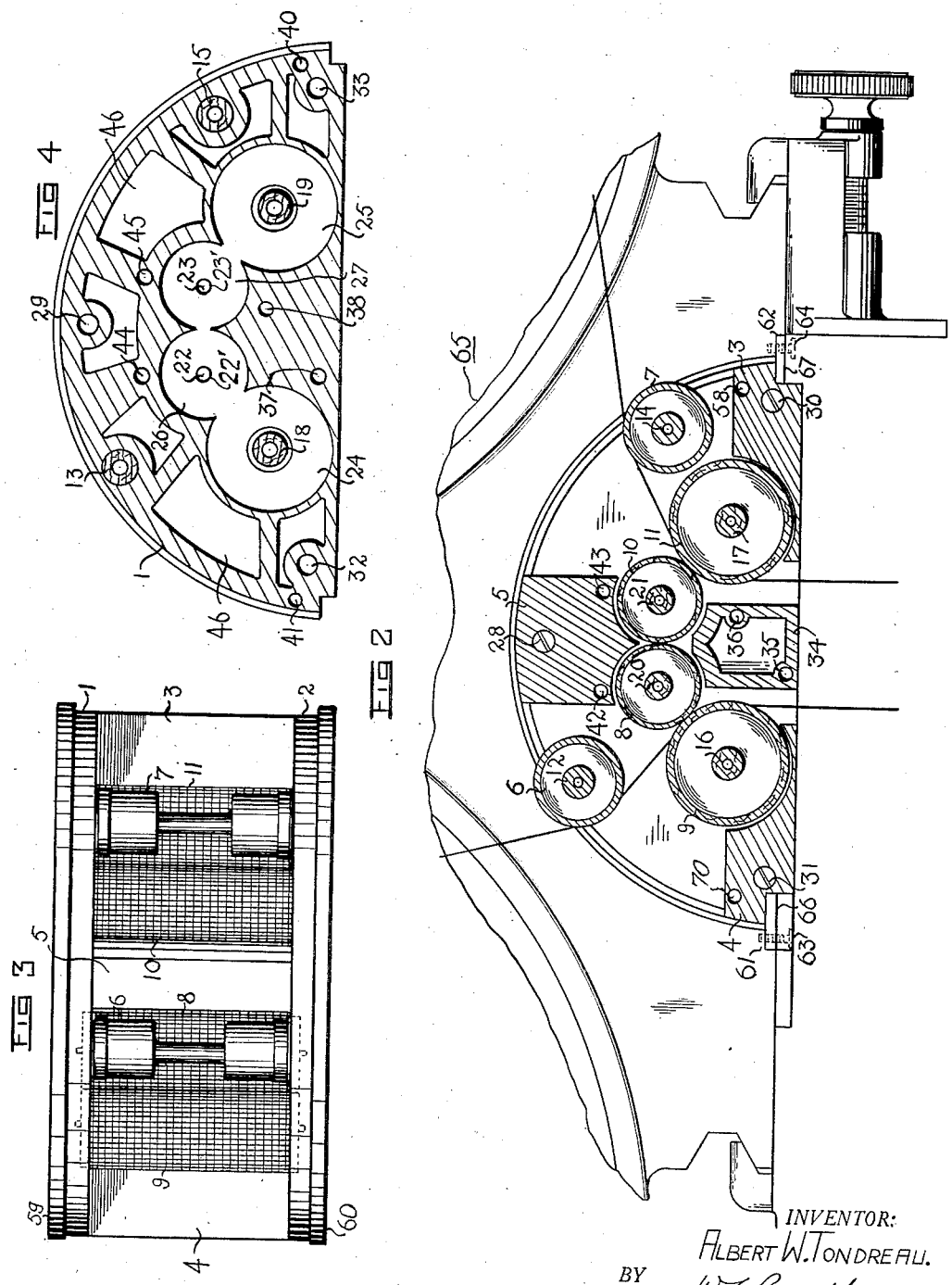

Patented Sept. 22, 1936

2,055,113

UNITED STATES PATENT OFFICE 2,055,113

LIGHT TRAP FOR FILM MAGAZINES

Albert W. Tondreau, Hollywood, Calif., assignor to Warner Bros. Pictures, Inc., New York, N. Y., a corporation of Delaware Application May 23, 1932, Serial No. 612,912

2 Claims. (Cl. 88—17)

The invention relates to motion picture film containers or magazines and more particularly to a light trap therefor.

In the past, film containers for use with a motion picture camera have consisted of two compartments, one to contain the raw negative stock, and the other to receive the film after it has been exposed: these two compartments being conjoined by an integral light trap.

The light trap consisted of three rollers mounted in one of two ways; either with two fixed rollers and one movable spring pressed roller, which maintained tangential tension onto the two fixed rollers, or with one fixed roller and two movable spring pressed rollers which maintained tangential tension on either side of the fixed roller.

The rollers were mounted flush with the inner face of the magazine walls, yet necessarily a small clearance was left to allow them to rotate, and this often permitted light to leak back into the container, and expose portions of the film. This is especially true as it is the practice of cameramen generally to set a film container down when not in use, with the light trap uppermost.

The rollers in this type of container are very difficult to clean, due to the fact that they are not detachable therefrom, and particles of dust or dirt collecting thereon serve either to let incidental light leak into the container or to scratch the film, and both conditions are very undesirable. When a magazine of this type was being loaded in the dark room, the operator had difficulty in threading the film through the light trap rollers in proper sequence, with the result that mistakes were often made and the film could not be run through the camera. This necessitated the return of the container to the dark room for reloading with the consequent loss of time and expense.

The present invention overcomes the above mentioned difficulties by providing a light trap which is detachable from the film container, whereby the light trap may be readily cleaned.

This new light trap provides a pair of contacting rollers adjacent the entrance and the exit to the container, whereby independent light seals are provided for separated portions of the film. Furthermore the supports for these rollers are countersunk to receive extended portions of the rollers, so that it is impossible for light to leak back into the container and inadvertently expose the film. Also struts or bridges are provided with curved surfaces adjacent the respective rollers, so that the film can only be threaded through the light trap in a pre-determined path.

Other objects and structural details of this invention will be apparent from the following detailed description when read in conjunction with the accompanying drawings, wherein Fig. 1 is a side elevation of the light trap in conjunction with a portion of the film container.

Fig. 2 is a side elevation of the light trap with the outer cover plate removed.

Fig. 3 is a plan view of the light trap.

Fig. 4 is a side elevation of one of the end plates of Fig. 3.

In order that the light trap may be easily cleaned, and the rollers thereof kept free from extraneous matter, so that the film will not be scratched thereby, the whole trap is detachable from the film container and it may be easily dismantled into its integral units.

The trap is made up primarily of two similar semi-circular end plates 1 and 2 (Fig. 3) conjoined by three bridges or struts, 3, 4 and 5. The end plates 1 and 2 have raised rails 59 and 60 respectively which ride in semi-circular grooves cut in the outer walls of the container 65 (Fig. 3) and form a light tight seal therewith.

The light trap is locked in its adjusted position with the container 65 and secured against rotary movement by means of two rectangular locking plates 61 and 62 which fit in recessed grooves 66—67, (Fig. 2) cut in the walls of the container 65 and in opposite ends of the base of the light trap. These plates 61 and 62 are suitably secured by means of screws, two of which, 63 and 64 are shown.

A cast duralumin roller 6 is journaled between the two end plates 1 and 2 and its shaft 12 supported by hard wooden bearings of which one, 13 is shown (Fig. 4) in such a manner that tension is always maintained on film being taken from the container. A similar roller 7 is journaled between the two end plates 1 and 2 and supported by hard wooden bearings, of which 15 is shown (Fig. 4), in such a manner that tension is always maintained on exposed film being returned to the container. Two pairs of rollers 8—9 and 10—11 are mounted adjacent the entrance and exit of the container respectively. The rollers 9 and 11 have shafts 16 and 17 which are supported by hard wooden bearings (of which 18 and 19 respectively are shown in Fig. 4) in the end plates 1 and 2. Rollers 8 and 10 have shafts 20 and 21 respectively which project through apertures 22' and 23' in the end plate 1, and similar apertures in the end plate 2

(not shown) and fit into apertures cut in wooden bearing blocks, two of which, 47 and 48 are shown in Fig. 1. These wooden blocks, 47 and 48 have fixed pivot points, 49 and 50 and small wire springs such as 51 and 52 press onto the bearing blocks above the ends of the shafts 20 and 21 and maintain tangential pressure between the rollers 8 and 9, 10 and 11 respectively. Two apertures 53 and 54 serve to receive screws (not shown) which hold a cover plate for this apparatus in place. The end plates 1 and 2 are recessed to receive extended portions of the rollers 8—9, 10 and 11 as shown at 22, 23, 24 and 25 respectively (Fig. 4). The rollers 8—9, 10 and 11 are covered with some non-actinic soft material, such as black velvet as shown in Fig. 3, in order to prevent the possibility of light leaking back into the container, and to further this purpose the whole of the inside of the light trap is painted with a dull non-actinic paint.

The end plates 1 and 2 of the light trap are fastened together by means of bridges or struts 3, 4 and 5 as beforementioned.

The bridge 5 is held in place by means of the screw 28 (Figs. 1 and 2) which passes through an aperture in the center thereof, and through an aperture 29 cut in the end plate 1 and a similar aperture (not shown) cut in the end plate 2. Screw 28 is fastened by a circular nut 66 (Fig. 1). A slit in the face of nut 66 correlates with a dummy slit in the end of the screw 28 so that a special recessed screw driver is necessary to unfasten the two. This precludes an unauthorized operator from opening the trap.

Bridge 5 is prevented from rotary movement by means of the studs 42 and 43 (Fig. 2) which fit into apertures in the end plate 2 similar to apertures 44 and 45 in the end plate 1. The bridges 3 and 4 are held in place by means of screws 30 and 31 respectively. These screws are similar to the screw 28. The screw 30 passes through an aperture in the center of the bridge 3 and an aperture 33 in the end plate 1. The bridge 3 is prevented from rotary movement by means of the stud 58 which fits into an aperture in the end plate 2 similar to the aperture 40 in the end plate 1. The screw 31 passes through an aperture in the center of the bridge 4 and an aperture 32 in the end plate 1. Stud 70 fits into an aperture in the end plate 2 similar to the aperture 41 in the end plate 1 and prevents the bridge 4 from rotary movement.

A bridge 34 having a curved top to conform to the shapes of the rollers 8 and 10, is held in place between the two end plates 1 and 2 by means of studs, two of which, 35 and 36 are shown. These studs fit into apertures in the end plate 2 similar to apertures 37 and 38 in the end plate 1 as shown in Fig. 4.

The end plates 1 and 2 are skeletonized or recessed for the sake of lightness as will be seen at 46 in Fig. 4, also all of the bridges have curved surfaces closely adjacent their respective rollers as shown, to conform to the curvature thereof, thus insuring that during the threading operation, the film will pass in the proper direction around the rollers. The opposite vertical sides of strut 34 assist in guiding the film from the rollers 8 and 9 and also assist in guiding the film to a point between the rollers 10 and 11. The four struts shown, thus provide a series of guards and guides which provides substantially a guiding or self-threading path for the film through the light trap.

Thus a light trap is provided which may be easily and quickly detached from the film container and dismantled into its integral units for cleaning. Worn parts may be readily detected and new ones substituted and a perfectly clean set of rollers maintained at all times, insuring that the film will not be scratched by extraneous matter in its path from one compartment to another, nor will light be able to leak back into the container and fog the film.

Having thus described the invention what is claimed as new and is desired to secure by Letters Patent is:

1. A removable light trap for a film magazine comprising a plurality of guide rollers for the entrance and exit of film into and from said magazine, a pair of contacting relatively movable rollers adjacent each guide roller, a non-actinic covering of soft material for each of said pairs of rollers, supporting members for said rollers, said supporting members being recessed to receive extended portions of said rollers, coil spring tensioning means tending to separate said movable rollers but urging said movable rollers against said guide rollers, means providing a guiding path for the film to be threaded through said light trap, said means comprising a plurality of bridges interconnecting said supporting members and having curved surfaces closely adjacent said pairs of rollers to conform to the curvature thereof, and means for attaching said light trap to said magazine.

2. A removable light trap for a film magazine comprising a plurality of rollers over which film is adapted to pass, said rollers being provided with non-actinic covers, a pair of end members for supporting certain of said rollers, means for holding said members spaced apart and means supported by said end members for tensioning certain other rollers against said first mentioned rollers of said plurality, said members being countersunk to receive extended portions of all of said rollers whereby light leakage around the ends of said rollers is prevented.

ALBERT W. TONDREAU.